United States Patent
Baughman et al.

(10) Patent No.: US 12,096,152 B2
(45) Date of Patent: Sep. 17, 2024

(54) CONTROLLING PARTICIPANT INTERACTION WITHIN REMOTE MEETING SESSIONS

(71) Applicant: INTERNATIONAL BUSINESS MACHINES CORPORATION, Armonk, NY (US)

(72) Inventors: Aaron K. Baughman, Cary, NC (US); Phani Kumar V. U. Ayyagari, Hyderabad (IN); Madan K Chukka, Hyderabad (IN); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 17/930,446

(22) Filed: Sep. 8, 2022

(65) Prior Publication Data

US 2024/0089406 A1    Mar. 14, 2024

(51) Int. Cl.
H04N 7/15          (2006.01)
H04L 12/18         (2006.01)
H04N 7/14          (2006.01)

(52) U.S. Cl.
CPC ......... H04N 7/152 (2013.01); H04L 12/1822 (2013.01); H04N 7/147 (2013.01)

(58) Field of Classification Search
CPC .......... H04N 7/152; H04N 7/147; H04N 7/15; H04L 12/1822; H04L 12/1827; G06F 3/165

See application file for complete search history.

(56) References Cited

U.S. PATENT DOCUMENTS

| | | | |
|---|---|---|---|
| 6,963,353 B1 | 11/2005 | Firestone | |
| 8,739,045 B2 | 5/2014 | Pang | |
| 8,867,721 B2 | 10/2014 | Hanson | |
| 9,666,209 B2 | 5/2017 | Basson | |
| 10,999,333 B2 | 5/2021 | Borghetti | |
| 2016/0042648 A1 | 2/2016 | Kothuri | |
| 2017/0353694 A1* | 12/2017 | Yoakum | G06F 3/165 |
| 2021/0397402 A1* | 12/2021 | Ashkenazi | H04L 65/80 |
| 2022/0086393 A1* | 3/2022 | Peters | H04N 7/147 |

(Continued)

FOREIGN PATENT DOCUMENTS

CN   103516889 A   1/2014
CN   108111701 A   6/2018

(Continued)

Primary Examiner — Yogeshkumar Patel
(74) Attorney, Agent, or Firm — Lily Neff

(57) ABSTRACT

A computer-implemented method, a computer system and a computer program product control participant interaction within remote meeting sessions. The method includes capturing participant data using a device, where the participant data is associated with a participant within the remote meeting session and is selected from a group consisting of: audio data, image data and text data. The method also includes identifying an event in the participant data. The method further includes determining that the participant has not modified a participant interaction mode. Lastly, the method includes modifying the participant interaction mode of the participant when the event is classified as causing a change of the participant interaction mode.

20 Claims, 2 Drawing Sheets

(56) References Cited

U.S. PATENT DOCUMENTS

| | | |
|---|---|---|
| 2022/0139383 A1 | 5/2022 | Rose |
| 2022/0263877 A1* | 8/2022 | Conlin ................ H04L 65/4015 |
| 2023/0041780 A1* | 2/2023 | Lukyanenko ......... H04L 67/143 |

FOREIGN PATENT DOCUMENTS

| | | |
|---|---|---|
| CN | 110099182 A | 8/2019 |
| WO | 2012079510 A1 | 6/2012 |

* cited by examiner

CONTROLLING PARTICIPANT INTERACTION WITHIN REMOTE MEETING SESSIONS

BACKGROUND

Embodiments relate generally to the field of controlling participant interaction within a remote meeting session and more specifically, to determining that events that may occur around a participant during a remote session necessitate a change to the participant's interaction mode within the session.

In the current professional environment and technology ecosystem, collaboration with others may be accomplished through conducting remote meeting sessions using videotelephony services on the Internet and popular software applications that may be available to users. The videotelephony services may enable the reception and transmission of audio and video signals by users in different locations, thereby providing a means to communicate video and voice between users in real time. Each meeting participant may transmit a video image of themselves along with audio of their voice using a personal computing device, such as a smart phone, tablet computing device, or personal computer, and each user may participate from any chosen location such as an office location or from home. Remote meeting software applications may allow any participant to customize their interaction with the remote meeting session by providing the ability to activate or deactivate the user's devices, such as a microphone or a camera, at any time.

SUMMARY

An embodiment is directed to a computer-implemented method for controlling participant interaction within remote meeting sessions. The method may include capturing participant data using a device, where the participant data is associated with a participant within the remote meeting session and is selected from a group consisting of: audio data, image data and text data. The method may also include identifying an event in the participant data. The method may further include determining that the participant has not modified a participant interaction mode. Lastly, the method may include modifying the participant interaction mode of the participant when the event is classified as causing a change of the participant interaction mode.

The method may include capturing participant data using a device, where the participant data is associated with a participant within the remote meeting session and is selected from a group consisting of: audio data, image data and text data. The method may also include identifying an event in the participant data. The method may further include determining that the participant has not modified a participant interaction mode. Lastly, the method may include modifying the participant interaction mode of the participant when the event is classified as causing a change of the participant interaction mode.

In another embodiment, the method may include determining that the participant has modified the participant interaction mode. In this embodiment, the method may also include classifying the event as causing the change of the participant interaction mode.

In a further embodiment, the capturing the participant data may include obtaining prior participant data from a server, where the prior participant data is associated with a plurality of prior remote meeting sessions. In this embodiment, the capturing the participant data may also include detecting that a prior participant in a prior remote meeting session has modified the participant interaction mode. In this embodiment, the capturing the participant data may further include associating a change of the participant interaction mode with the participant data.

In yet another embodiment, the classifying the event as causing the change of the participant interaction mode may include determining a confidence level of a correlation between the event and the change of the participant interaction mode and classifying the event as causing the change of the participant interaction mode when the confidence level is above a threshold.

In an embodiment, a machine learning model is used to determine the correlation between the event and the change of the participant interaction mode.

In a further embodiment, the method may include monitoring the participant interaction mode within the remote meeting session after modifying the participant interaction mode of the participant. In this embodiment, the method may include updating a classification of the event when the participant interaction mode within the session is modified by the participant after the modifying the participant interaction mode.

In yet another embodiment, the method may include determining that an attention level of the participant within the remote meeting session is below a threshold. In this embodiment, the method may also include generating a question for the participant based on the attention level of the participant and the participant data using a natural language algorithm and transmitting the question to the participant. In this embodiment, the method may further include monitoring the participant data for a response to the question from the participant and modifying the participant interaction mode based on the response.

In addition to a computer-implemented method, additional embodiments are directed to a system and a computer program product for controlling participant interaction within remote meeting sessions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
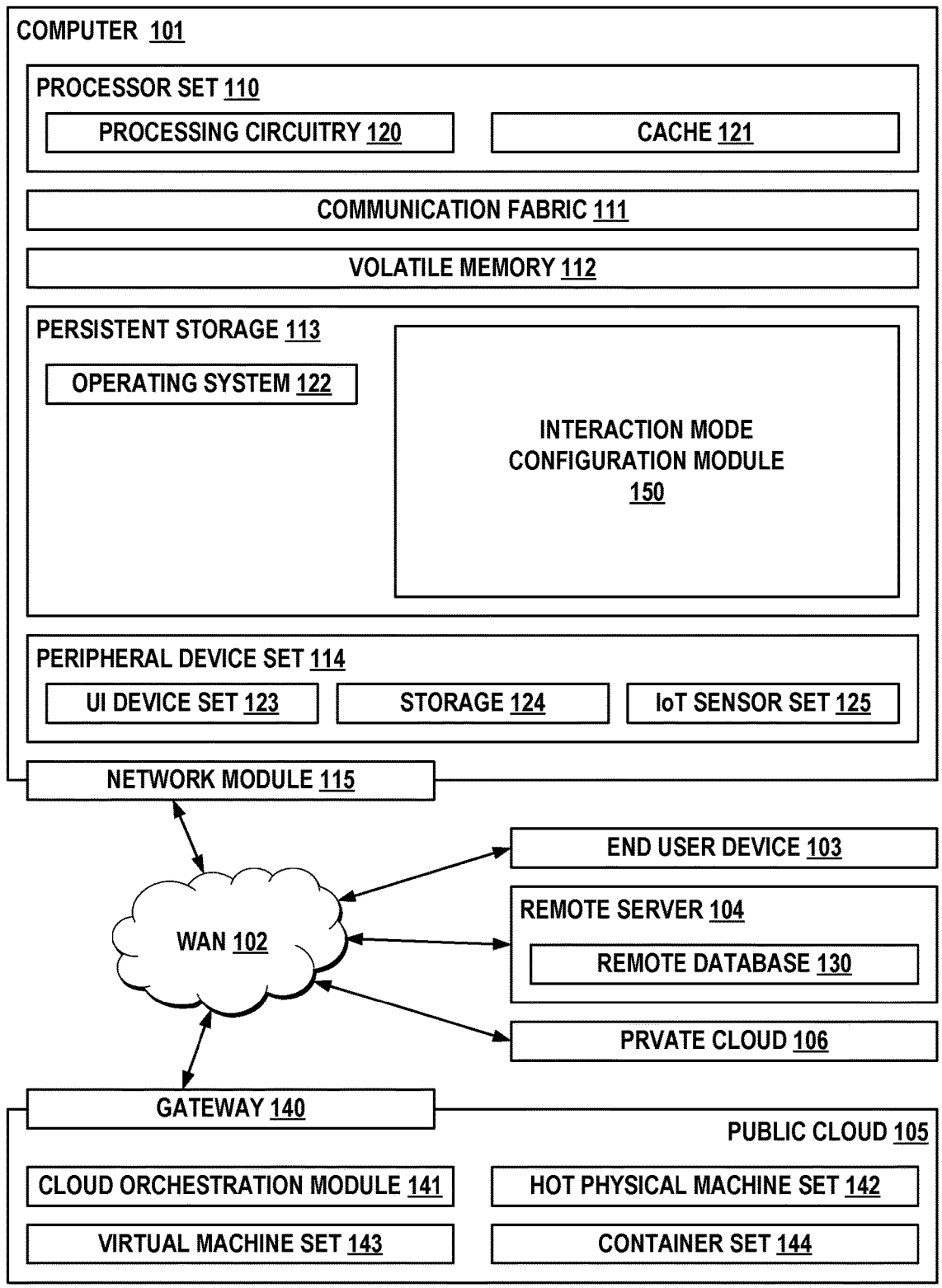
FIG. 1 depicts a block diagram of an example computer system in which various embodiments may be implemented.

The current professional environment and the videotelephony capabilities of the Internet have placed a premium on the use of remote meeting sessions to facilitate collaboration and communication among users. Many users may currently work from home or another remote location, meaning that much of the professional and personal interactions in those users' lives may be conducted through remote meeting sessions and the corresponding software applications that may provide such services. These services allow work from a convenient location but may also present challenges in balancing personal and professional lives. For example, a household chore may need managing at the same time as an important professional meeting or a parent may need to tend to a child while attending a meeting, which may create disturbances for the other participants in the remote meeting session in the form of audio and video noises, all of which may result in a less productive meeting session.

The software that may provide services to participants in a remote meeting session may allow for audio and video, as well as shared images of a participant device such as a display of a presentation, to be shared among the participants in the remote meeting session. At the same time, this software may also allow for control of a participant's interaction with the other participants. This may include the activation or deactivation of the devices that the software may be using to provide audio and video, i.e., muting a microphone or turning off a camera. This action may be taken manually by a participant based on a situation in the remote location, but such a manual process raises potential problems of reliability, e.g., a participant forgets to turn off the video when a loud distraction takes place, or efficiency, e.g., an unplanned disturbance occurs and productivity of the meeting decreases. Examples of possible disturbances of a remote meeting session may include small children making sounds near the participant, actions or movements of a participant, including hand waving or various facial expressions, including looking away from the camera toward other people in a remote location or specific words that may be spoken by a participant or a certain tone of voice in the participant.

It may therefore be useful to provide an automated method or system for controlling participant interaction within remote meeting sessions. Such a method or system may predict those situations that a participant may deem inappropriate for broadcasting to the remote meeting session and may use such a prediction to automatically control the participant's interaction mode, e.g., temporarily disabling the microphone or camera, when a situation may arise that is predicted to be consistent with a participant's wishes not to broadcast the potential disturbance. Such an act may be referred to as selective filtering.

Such a method or system may improve remote meeting session applications by observing the audio and video that may be transmitted from the remote location of the participant in the context of situations that may lead a user to manually mute their microphone or disable their camera temporarily. The method or system may also gather data from both individual participants in a remote meeting session or from a remote meeting session as a group, where the interactions among participants may be analyzed together to derive a confidence level of which types of situations should not be broadcast. In addition, the method or system may monitor ongoing web conferences and, as prior predictions may indicate, automatically apply muting of a microphone or turn off a camera, while also automatically enabling the camera or microphone if the method or system determined that a situation has passed. Such a method or system may, in addition to improving the technical capabilities of remote meeting session applications, improve the efficiency of the remote meeting sessions by removing distractions from the group and allowing a sharper focus on productivity in the remote meeting session.

Referring to FIG. 1, computing environment 100 contains an example of an environment for the execution of at least some of the computer code involved in performing the inventive methods, such as interaction mode configuration module 150. In addition to interaction mode configuration module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and interaction mode configuration module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in interaction mode configuration module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in interaction mode configuration module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to control the interaction of participants within remote meeting sessions. In particular, the interaction mode configuration module 150 may capture participant data during a remote meeting session and predict whether the interaction mode should be changed, e.g., mute or unmute the microphone or turn on or off the camera, based on the surroundings of the participant. The participant data may include audio or video of the participant in a remote location or images that may be shared within the remote meeting session. While it is most likely that the device that a participant may use to connect to the remote meeting session would also capture the participant data for these purposes, this is not required. Other mobile devices or "Internet of Things" (IoT) devices may be present in the remote location and used to capture participant data if the devices are equipped to do so and also communicate with the interaction mode configuration module 150. In a learning, or training phase, the module 150 may capture participant data at the time that a change in the interaction mode is detected. For example, if the participant is disrupted by noise in their remote location, the participant may mute the microphone to silence the connection and the participant data may be captured and the disruption identified. In an embodiment, the module 150 may classify the identified disruption as related to a change in the interaction mode and store the classification in a database for later use. Alternatively, the interaction mode module 150 may detect a disruption in participant data in a current remote meeting session and the module may rely on its machine learning to predict that the disruption is likely to cause the participant to change the interaction mode. The module 150 may change the interaction mode automatically based on the prediction, including enabling audio or video if a disruption may have ended.

It should be noted that all collection of information from a remote meeting session or any other device that may personally identify a participant or any person that may be present in a remote location or is sensitive in any other way requires the informed consent of all people whose information may be collected and analyzed for the purposes of the invention. Consent may be obtained in real time or through a prior waiver or other process that informs a subject that their information may be captured by a device or other process and that the information may be used to predict the interaction mode of a participant in a remote meeting session. The information owner is free to decide at any time to revoke consent for use of sensitive information as these settings are permanently retained to keep the interaction mode configuration module 150 updated with the latest information and also allow the owner of the information complete control over their informed consent to use sensitive information in the course of the invention. The consent described here may also refer to allowing some, or any, data relating to an information owner from being sent to a local server, cloud server or any other location. The owner has complete control on the transmission of information that may be sensitive or personally identify the owner of the information beyond the remote location.

Figure 2:
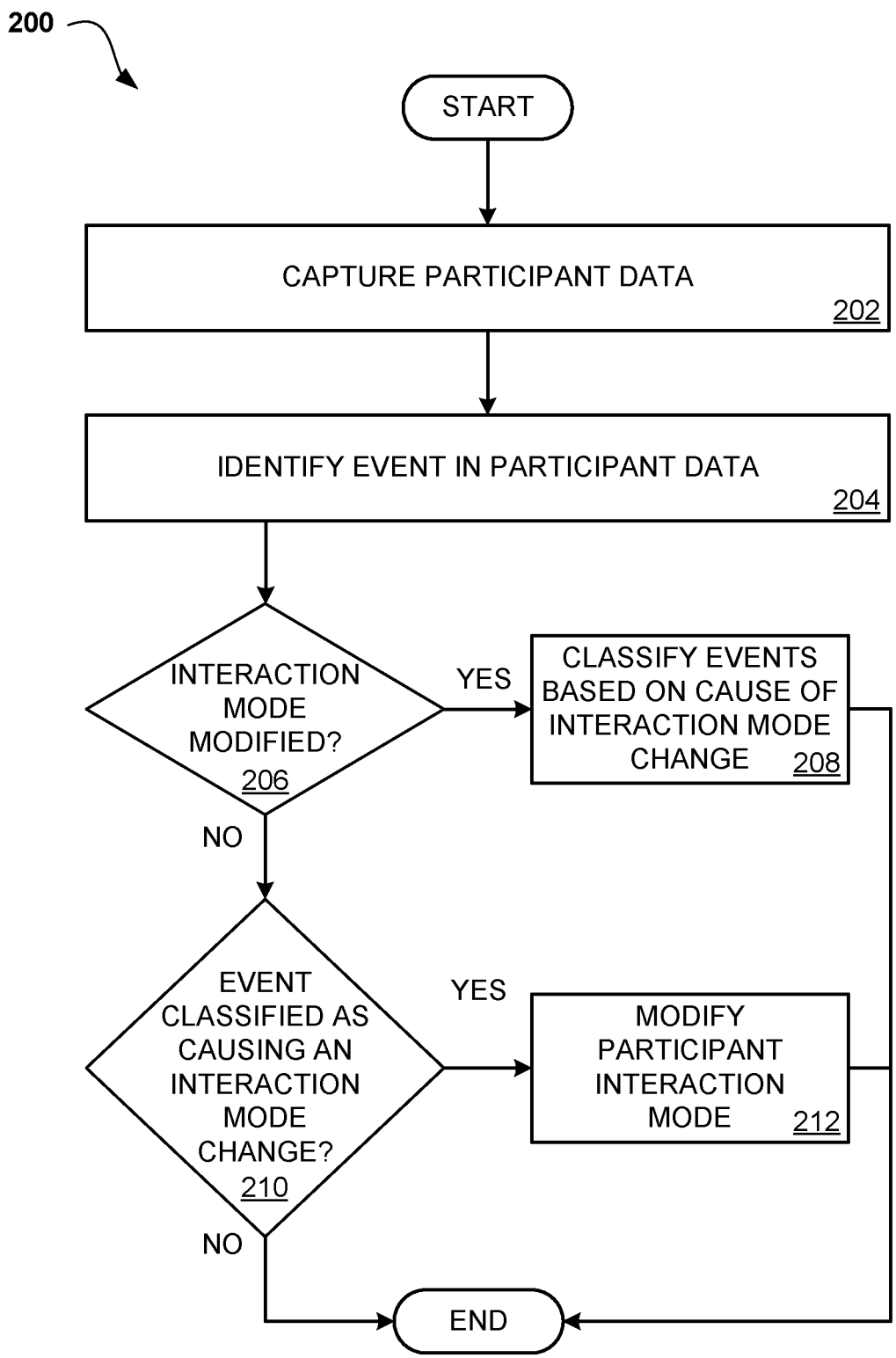
FIG. 2 depicts a flow chart diagram for a process that controls participant interaction mode within remote meeting sessions according to an embodiment.

Referring to FIG. 2, an operational flowchart illustrating a process 200 that may control participant interaction mode within remote meeting sessions is depicted according to at least one embodiment. At 202, remote session data, including audio or video, or data from Internet of Things (IoT) devices or mobile devices that may be carried by a user, may be captured in the physical environment surrounding a participant at a remote location using an appropriate device. Examples of appropriate devices may include a microphone, fixed or non-fixed, that may be placed nearby to capture voices participating in a conversation that may be occurring in the physical environment, or a security camera that may be placed in the physical environment. A mobile device carried by the participant may include a microphone or camera that may be used to capture activity data and may also include position data, e.g., GPS data, that may be used to determine an exact location and movements of the participant. IoT devices that may be connected to a network may also include appropriate devices for capturing the remote session data.

In an embodiment, a microphone may be in an "always-listening" mode, such that no prompt is required to begin audio capture and/or recording. The microphone may also, at the option of a participant, be switched out of an "always-listening" mode (e.g., have the "always-listening" mode turned off). The same method of recording may be used with a camera to capture video in the physical environment. In addition to video or audio, devices within the physical environment may be set to transmit data, e.g., text messages that may be sent to or from at least one individual in the physical environment or position information about a participant or an object within the physical environment. It is not necessary for there to be many devices under control but rather that there be a mechanism for accepting voice or video input, or text and other data, from the physical environment. For instance, microphones or cameras or other devices may be mounted within the physical environment in conspicuous or inconspicuous locations, such as within a collaborative space such as a conference room in an office or perhaps a cafeteria in an office building. One alternative to fixed devices in a location may be devices embedded in a smartphone or other mobile device that may be carried by an individual within the physical environment, which may include a microphone or camera or even biometric data if the owner of the smartphone has a sensor attached and a corresponding application running on the smartphone. One of ordinary skill in the art would appreciate that one or more devices may be arranged in multiple ways to capture events that may be occurring within a physical environment.

Any audio or video or other data that may be captured at this step may be stored, subject to the user consent restrictions described above and also contingent on whether the data may include sensitive information, to allow for a processing buffer in identifying an event and classifying the events as related to a change in participant interaction mode or not.

It should be noted that prior remote meeting sessions may also be obtained from a server and analyzed by module 150. In this case, the prior remote meeting session may be scanned for a change in interaction mode by a participant and the module 150 may apply a flag to a real-time recording of the remote meeting session and note the time of the action and the action taken, e.g., "mute applied to microphone" or "video feed turned off". Each subsequent change in the interaction mode of the participant may be flagged in the recording throughout the duration of the remote meeting session in the same manner and the recording of the remote meeting session with flagged metadata may be stored for processing by the module 150. Such a prior recording may function as the participant data that is described in 202, where the module 150 may use the flags in the metadata of the recording to limit a search and identification of an event, as described below.

At 204, an event may be identified in the participant data along with an indication of whether the interaction mode has been changed by the participant. For the purposes of this step, the participant data may be real-time captured data from a current remote meeting session or a recording with flagged metadata as described in 202. The module 150 may apply machine learning visual and audio analysis of the remote meeting session to identify events that may occur in the participant data. The techniques that may be used at this stage may include a Convolutional Neural Network (CNN), including recognition, classification and identification of objects and people in the video data. Such a recognition algorithm may further include facial analysis including gaze detection or facial expression detection of a participant and any other people in the video data. The audio data within the participant data may be analyzed using Audio Source Identification, where a likely source of sounds may be identified within the audio data. Both the video data and audio data may be subject to voice tone analysis, where a tone of voice in a conversation within the remote meeting session may be derived by a machine learning model based on previously received training data, and also a natural language understanding (NLU) algorithm, where an audio conversation may be transcribed into text or a text conversation may be captured and the NLU algorithm used to classify and comprehend the discussion.

In the case of a prior remote meeting session where the accompanying metadata has been flagged for user changes in interaction mode, the identification of events may specifically analyze a time period immediately prior to the change in interaction mode to understand situation that caused the participant to change the interaction mode, a time period during the change in interaction mode to understand what happened when the microphone was muted or camera turned off, and also a time period immediately after a resolving user action, i.e., the participant changing the interaction mode back to the original state, to understand the situation that caused the participant to turn back on their microphone or camera. The invention system also records the contextual factors around these periods of user action including: Participants in the web conference, related to job role, project assignment, and organizational relationships, Time and duration of web conference, Location of participants during the web conference (in the home office, in the kitchen etc).

At 206, as events are identified, it may also be determined whether the interaction mode has been modified either manually by a participant or in any automatic way. The interaction mode of a participant may be related to a microphone being used by a specific participant or a camera that may be used by the same participant and changing the interaction mode may refer to turning the related device on or off. In the case of a prior remote meeting session, this information may be determined from the audio, image or text data itself or perhaps from metadata that may be associated with the participant data, meaning that the participant may have already been scanned and the individual changes in the interaction mode flagged, with the flags saved in the metadata according to the association with the audio, image or text data. In the case of a live remote meeting session, this information may be gathered as the session proceeds and the module 150 may act based on the information that may be gathered. If no change is detected, i.e., the interaction mode is not modified, then the module 150 would not act and events that may occur at these times would not be classified as causing a change in the interaction mode. However, if a change is detected at this step, then the process may continue to 208.

At 208, those identified events that also occur at the time of a change in interaction mode, or at least in a time window around a detected change, may be classified based on whether they cause the change in participant interaction mode. The techniques that are used to identify the events may be used further to make this classification, in tandem with additional machine learning. It should be noted that it is not required that an event that may be classified as causing a change in the participant interaction mode is taken directly by the participant. For example, an administrator may mute the audio of a participant if a disturbance is detected in the remote meeting session. In addition, the change in participant interaction mode may be turning on a device in addition to turning the device off and an insight about the cause of a change in one direction, e.g., the muting of a microphone, may be derived from an action in the opposite direction. For example, the circumstances of turning on the microphone or camera in a remote meeting session may lead to an insight into why the microphone was muted earlier or the camera turned off.

In an embodiment, a supervised machine learning classification model may be trained to derive insights from the audio, image or text data that may be captured and identified as an event. The derived insights may then be used to determine a correlation between an identified event and a change in the participant interaction mode that may have occurred. This correlation, and a confidence level in the derived insight and correlation, may be used to classify events based whether the identified event caused the change in the participant interaction mode. The machine learning model may base its classification on contextual cues found in the data that may lead a participant to change the interaction mode. As part of the classification process in this embodiment, each derived insight may be assigned a confidence level and the more often a particular contextual situation results in a change in participant interaction mode, the higher the confidence level of the derived insight and the more likely that the related event may be classified as causing the change in participant interaction mode. The confidence level may be evaluated against a threshold that may be pre-defined or learned by the module 150 over the course of a training process as confidence levels may be continually updated based upon observed participant behavior. One or more of the following machine learning algorithms may be used: logistic regression, naive Bayes, support vector machines, deep neural networks, random forest, decision tree, gradient-boosted tree, and multilayer perceptron. In an embodiment, an ensemble machine learning technique may be employed that uses multiple machine learning algorithms together to assure better prediction when compared with the prediction of a single machine learning algorithm.

In this embodiment, training data for the model may include insights derived from a participant's behavior or may include interactions of the participants with other participants in the remote meeting session or any person or object in the remote location of the participant while connected to a remote meeting session. The techniques used to derive insights can be expanded to include aggregate observations based on observations from other participants that share similar characteristics, e.g., a participant's work colleagues, or other participants of a similar age, job role, etc., which may strengthen the insights and the confidence levels. Participant consent is required prior to collection of any data from human participants and the classification results may be stored in a database so that the data is most current, and the output would always be up to date.

At 210, as events are identified in a current remote meeting session, a determination may be made whether an identified event has been classified as causing a change in the interaction mode. If the event is not classified as causing a change in the participant interaction mode, then the module 150 would not act and the remote meeting session would proceed with no changes. However, if the event is classified as causing a change in participant interaction mode, then the process would continue to 212.

At 212, the participant interaction mode may be changed if an identified event in a current remote meeting session has been classified as causing a change in the participant interaction mode. Included at this step is, optionally, feedback to the classification model that may include an understanding of the remote meeting session once the participant interaction mode has been changed by the module 150. To provide this potential feedback, module performance may be monitored by determining a participant's response to a selective filtering action. For instance, it may be determined whether the participant immediately turned a microphone back on when the module 150 had turned it off. In another example, a participant may have changed the participant interaction mode sooner than the module 150 had determined that a change was needed. In yet another example, the module 150 may look for situations where the module 150 may not have deemed a change in the participant interaction mode to be necessary but the participant did and temporarily muted the microphone or turning off the camera. In any situation, self-monitoring analysis may be fed back to the module 150 to improve insights that may be derived and potentially adjust confidence levels according to the feedback, which may also change the classification of identified events as causing a change in the participant interaction mode.

In addition to the above techniques for identifying events and determining whether the interaction mode of a participant should be changed, a "honeypot" attention technique may also be used. In such a technique, the module 150 may use a natural language algorithm to both create questions for a participant and also pose the question to the participant should the module 150 make a determination that a participant may not be attentive to the remote meeting session, or a determined attention level is below a threshold. While the question may be posed either with text on the screen during the remote session or audibly through a text to speech application, one of ordinary skill in the art will understand that there are many ways that an algorithm may form and pose questions to a participant. The natural language algorithm may learn from the mannerisms of a participant and determine that the participant may not be attentive to the remote meeting session and use that knowledge to form targeted questions. Such learning may also be responsive to the tone of voice of any participant or other people in the remote location and, should the question be posed audibly, may also alter the delivery, including cadence or tone of voice, of the question to the participant to assist in the learning.

Once the question has been posed to the participant, the module 150 may monitor the response of the participant to make a determination of attentiveness. For example, if there is no response to a question such as "are you there?", then it may be determined that the interaction mode should be changed until a response has been received. Other examples may be questions about whether the participant may be distracted or details about the events that may have been identified in the remote location. Answers to these questions may influence the classification of identified events with regard to the interaction mode and be used as feedback for the machine learning models that may be in use.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling participant interaction within a remote meeting session, the method comprising:
    capturing participant data using a device, wherein the participant data is associated with a participant within the remote meeting session and is selected from a group consisting of: audio data, image data and text data;
    identifying an event in the participant data;
    determining that the participant has not modified a participant interaction mode;
    determining a correlation between the identified event and the change in the participant interaction mode that occurs using a machine learning classification model, wherein the machine learning classification model is trained to derive insights from the audio, image or text data captured and identified as the event, wherein the correlation, and a confidence level in the derived insight and correlation, is used to classify events based whether the identified event caused the change in the participant interaction mode; and
    modifying the participant interaction mode of the participant when the event is classified as causing a change of the participant interaction mode.

2. The computer-implemented method of claim 1, further comprising:
    determining that the participant has modified the participant interaction mode; and
    classifying the event as causing the change of the participant interaction mode.

3. The computer-implemented method of claim 1, wherein the capturing the participant data further comprises:
    obtaining prior participant data from a server, wherein the prior participant data is associated with a plurality of prior remote meeting sessions;
    detecting that a prior participant in a prior remote meeting session has modified the participant interaction mode; and
    associating a change of the participant interaction mode with the participant data.

4. The computer-implemented method according to claim 2, wherein the classifying the event as causing the change of the participant interaction mode further comprises:
    determining a confidence level of a correlation between the event and the change of the participant interaction mode; and
    classifying the event as causing the change of the participant interaction mode when the confidence level is above a threshold.

5. The computer-implemented method according to claim 4, wherein a machine learning model is used to determine the correlation between the event and the change of the participant interaction mode.

6. The computer-implemented method according to claim 1, further comprising:
    monitoring the participant interaction mode within the remote meeting session after modifying the participant interaction mode of the participant; and
    updating a classification of the event when the participant interaction mode within the session is modified by the participant after the modifying the participant interaction mode.

7. The computer-implemented method according to claim 1, further comprising:
    determining that an attention level of the participant within the remote meeting session is below a threshold;
    generating a question for the participant based on the attention level of the participant and the participant data using a natural language algorithm;
    transmitting the question to the participant;
    monitoring the participant data for a response to the question from the participant, and
    modifying the participant interaction mode based on the response to the question.

8. A computer system for controlling participant interaction within a remote meeting session, comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
    capturing participant data using a device, wherein the participant data is associated with a participant within the remote meeting session and is selected from a group consisting of: audio data and video data;
    identifying an event in the participant data;
    determining that the participant has not modified a participant interaction mode;
    determining a correlation between the identified event and the change in the participant interaction mode that occurs using a machine learning classification model, wherein the machine learning classification model is trained to derive insights from the audio, image or text data captured and identified as the event, wherein the correlation, and a confidence level in the derived insight and correlation, is used to classify events based whether the identified event caused the change in the participant interaction mode; and modifying the participant interaction mode of the participant when the event is classified as causing a change of the participant interaction mode.

9. The computer program product according to claim 8, further comprising:
determining that the participant has modified the participant interaction mode; and
classifying the event as causing the change of the participant interaction mode.

10. The computer program product according to claim 8, further comprising:
obtaining prior participant data from a server, wherein the prior participant data is associated with a plurality of prior remote meeting sessions;
detecting that a prior participant in a prior remote meeting session has modified the participant interaction mode; and
associating a change of the participant interaction mode with the participant data.

11. The computer program product according to claim 9, wherein the first classifying the event as causing the change of the participant interaction mode further comprises:
determining a confidence level of a correlation between the event and the change of the participant interaction mode; and
classifying the event as causing the change of the participant interaction mode when the confidence level is above a threshold.

12. The computer system according to claim 11, wherein a machine learning model is used to determine the correlation between the event and the change of the participant interaction mode.

13. The computer program product according to claim 8, further comprising:
monitoring the participant interaction mode within the session after modifying the participant interaction mode of the participant; and
updating a classification of the event when the participant interaction mode is modified by the participant.

14. The computer program product according to claim 8, further comprising:
determining that an attention level of the participant within the remote meeting session is below a threshold;
generating a question for the participant based on the attention level of the participant and the participant data using a natural language algorithm;
transmitting the question to the participant;
monitoring the participant data for a response to the question from the participant; and
modifying the participant interaction mode based on the response to the question.

15. A computer program product for controlling participant interaction within a remote meeting session, comprising:
a computer readable storage device having program instructions embodied therewith, the program instructions executable by a processor to cause the processor to perform a method comprising:
capturing participant data using a device, wherein the participant data is associated with a participant within the remote meeting session and is selected from a group consisting of: audio data and video data;
identifying an event in the participant data;
determining that the participant has not modified a participant interaction mode;
determining a correlation between the identified event and the change in the participant interaction mode that occurs using a machine learning classification model, wherein the machine learning classification model is trained to derive insights from the audio, image or text data captured and identified as the event, wherein the correlation, and a confidence level in the derived insight and correlation, is used to classify events based whether the identified event caused the change in the participant interaction mode; and
modifying the participant interaction mode of the participant when the event is classified as causing a change of the participant interaction mode.

16. The computer program product according to claim 15, further comprising:
determining that the participant has modified the participant interaction mode; and
classifying the event as causing the change of the participant interaction mode.

17. The computer program product according to claim 16, wherein the capturing the participant data further comprises:
obtaining prior participant data from a server, wherein the prior participant data is associated with a plurality of prior remote meeting sessions;
detecting that a prior participant in a prior remote meeting session has modified the participant interaction mode; and
associating a change of the participant interaction mode with the participant data.

18. The computer system according to claim 16, wherein the classifying the event as causing the change of the participant interaction mode further comprises:
determining a confidence level of a correlation between the event and the change of the participant interaction mode; and
classifying the event as causing the change of the participant interaction mode when the confidence level is above a threshold.

19. The computer program product according to claim 18, wherein a machine learning model is used to determine the correlation between the event and the change of the participant interaction mode.

20. The computer program product according to claim 15, further comprising:
monitoring the participant interaction mode within the session after modifying the participant interaction mode of the participant; and
updating a classification of the event when the participant interaction mode is modified by the participant.

* * * * *